RECORD CHANGER SPINDLE

Original Filed March 30, 1951

INVENTOR.
James E. Vistain Jr.
BY
J. W. Douglas
His Att'y.

United States Patent Office 3,191,940
Patented June 29, 1965

3,191,940

RECORD CHANGER SPINDLE

James E. Vistain, Jr., Skokie, Ill., assignor to Admiral Corporation, Chicago, Ill., a corporation of Delaware Continuation of application Ser. No. 218,493, Mar. 30, 1951. This application June 20, 1960, Ser. No. 50,989
3 Claims. (Cl. 274—10)

This application is a continuation of Serial No. 218,493, filed March 30, 1951, now abandoned.

This invention relates to spindles for an automatic record player, the spindle being of the type in which support for a stack of records is provided by an offset between an upper pilot portion and a base portion, the latter having a shoulder thereon engaged by the lowermost of the records. More especially, the invention relates to improvements in a spindle of the foregoing description by means of which only the lowermost record may be removed from the shoulder by mechanism in the spindle itself in response to operation of suitable operating mechanism, actuated when a record is rejected.

Although record changer spindles having ejector or push-off mechanisms as a part of their structures are known to the prior art, their mechanisms are complicated and consequently expensive. By the present invention, a satisfactory yet novel record changer spindle has been produced which is of simplified construction and therefore available at a cost lower than spindles of this class as previously constructed.

For a further and better understanding of the invention besides one manner in which it may be carried out, reference may be had to the accompanying drawings in which.

Figures 1, 2, 3, 4, 5, 6:
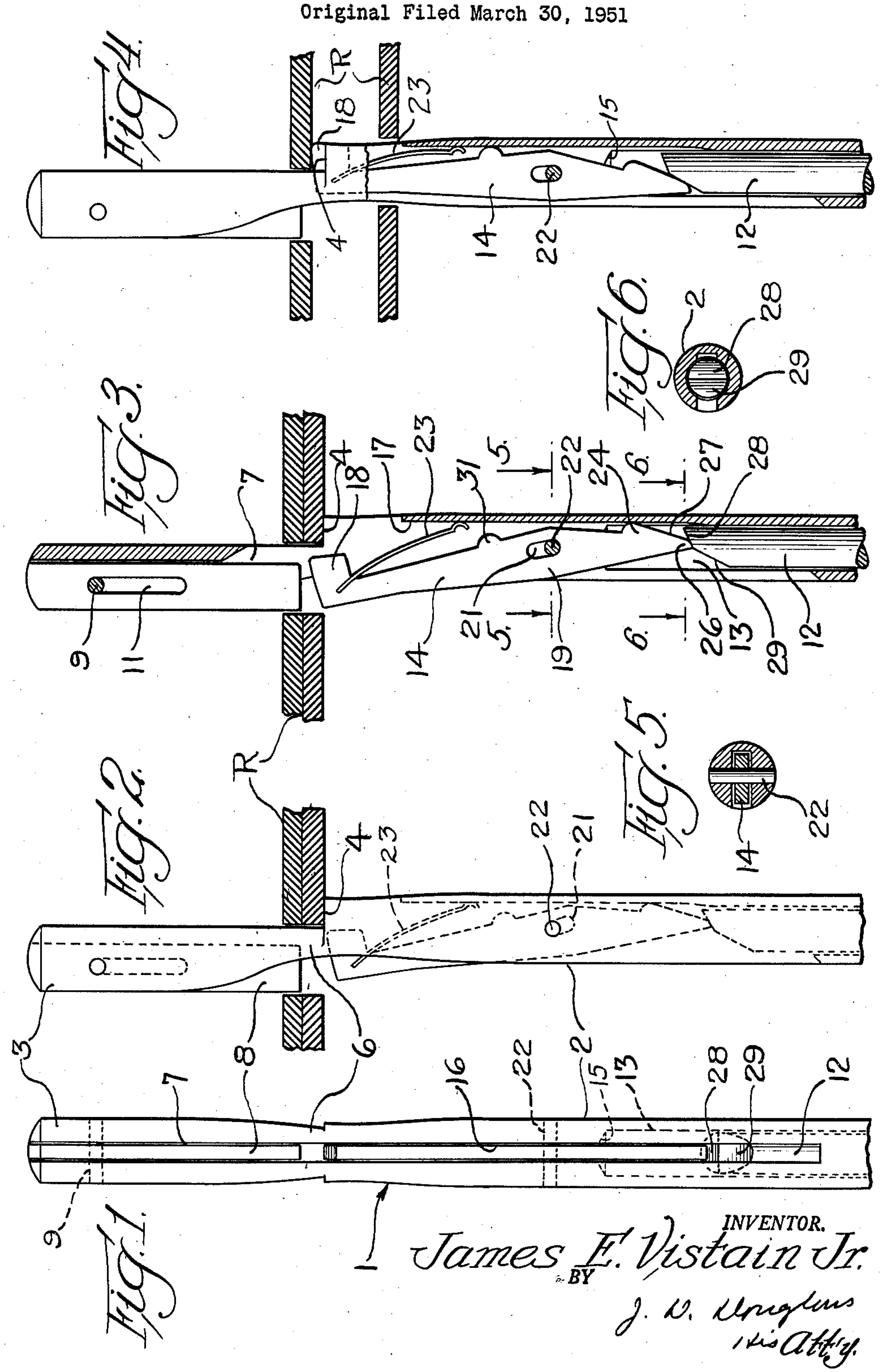
FIG. 1 is a fragmentary elevational view of a spindle in which the invention is incorporated.
FIG. 2 is a fragmentary view of the same, the spindle having been turned through a quarter turn and bearing a plurality of records.
FIG. 3 is a view corresponding to FIG. 2, parts being broken away to reveal the structure of other parts some of which are in different positions.
FIG. 4 is a view corresponding to FIG. 3, parts being shown in a third position.
FIG. 5 is a sectional view taken on line 5—5 of FIG. 3.
FIG. 6 is a sectional view taken on line 6—6 of FIG. 3.

In FIG. 1 the reference character 1 is used to denote, in its entirety, a record changer spindle. In includes a base portion 2, the lower end of which, although not shown, is adapted to extend through a conventional turntable of a record player and is rigidly supported by any suitable means therebelow. Above the base portion 2, the spindle includes a pilot portion 3 in offset relation to the base portion 2, a shoulder 4 being thereby provided on which records R are adapted to rest while their center holes are threaded over the pilot portion. The pilot portion 3 and shoulder 4 therefore provide magazine means where a stack of records are retained above the level of the turntable to which one record at a time is released from the magazine until the supply of unplayed records is exhausted. This is effected by means to be described hereinafter. In their passage downward, the records pass over a neck section 6, at the junction of the pilot and base portions, which is of reduced thickness and in part defined by a side at the left thereof (FIG. 2) which is curvilinear in formation. The purpose of this reduction in thickness is to afford clearance for the lowermost of the records to be moved to the right (FIG. 2) so that it may be freed from the support of shoulder 4; and also to facilitate removal of records from the spindle after they have been reproduced.

Since the clearance region is of narrower dimension than the remainder of the spindle, the records above the bottom are retained against lateral displacement by additional means. This means includes a vertically extending kerf 7 in which a gate member 8 is slidably anchored by a pin 9, fixed to the pilot portion 3 and passing freely through a slot 11 longitudinally of the gate member 8. Normally, the gate member 8 is adapted to occupy the position shown. In this position, its lower end is in a horizontal plane spaced by less than the thickness of two records and more than the thickness of one record from the horizontal plane in which the shoulder 4 lies. Therefore, it will be apparent that the records above the bottom record, i.e., the record engaging the shoulder 4, are held against substantial displacement in a direction normal to the pilot portion 3. This construction is similar to that shown and described in U.S. Patent No. 2,498,333, issued to W. J. Faulkner on February 21, 1950.

For dislodging a record from the shoulder 4, novel mechanism is employed. It includes a lift rod, cam carrier or operating member 12, slidably journalled in a bore 13, extending upward to the extent indicated at 15, from the lower extremity of the spindle. The rod is adapted to be moved longitudinally thereof by any cyclically operating mechanism, commonly found in a record player, which is adapted to operate automatically when a record is rejected. One such operating mechanism adapted to move a center rod, such as this, is disclosed in my co-pending application, Ser. No. 99,191 filed June 18, 1949. Normally, the rod 12 will occupy a lower position (FIG. 2) being urged to this position by gravity or by spring pressure.

The operating member 12 is adapted to cooperate with an ejector member or lever 14 above said operating member. The lever 14 is disposed in a slot 16 which is a continuation of the kerf 7 extending into the bore 13. Below the shoulder 4 for a short distance to a back portion 17, the slot 16 completely divides the base portion 2 diametrically thereof. The purpose of the division of spindle 2 above the back wall 17 is to afford clearance for movement of a lateral extension or ejector portion 18 at the upper end of the ejector member 14. Intermediate its ends, member 14 includes an anchorate portion 19 which is apertured by a slot 21 extending in a substantially longitudinal direction in said member. A pivot pin 22 fixed to the base portion 2 bridges the slot 16 and also passes through the slot 21. The lever 14 is thereby adapted to be moved longitudinally over the pin 22 and also to be swung about said pin within limits later to be indicated. Briefly, the lever 14 is floatingly associated with the stationary portions of the spindle.

While in its normal position (FIG. 2), i.e., the position which it occupies while a record is being reproduced, the upper end of lever 14 is slightly below the level of the shoulder 4 and consequently spaced from the lowermost of the records magazined on the pilot portion 3. While in this position, the lever 14 may be suspended on the pin 22. At the same time, its ejector portion 18 is biased counterclockwise of the pin 22 by a leaf spring 23, fixed to the upper end of the lever 14, which is deflected by its engagement with the back wall 17, against which said spring is adapted to slide during longitudinal movement of the ejector member. The spring 23 is therefore responsible for a backward or retracted, normal position for the ejector portion 18 wherein it is immediately below the center hole of the lowermost of the records R. As an assistance to preserve equilibrium of this position an abutment or stop lug 24 (FIG. 3) on lever 14, engages the back wall 17.

From its normal position, shown in FIG. 2, the lever 14 is adapted to be moved to a second or upper position, indicated in FIG. 3. Therein, the ejector portion 18 is readily received in the center hole of the lowermost of the records R, although said ejector portion does not reach a horizontal plane quite as high as the record next above the bottommost record. Following its entry into the center hole of the bottom record, the lever 14 is swung clockwise about the pivot pin 22 during which operation the ejector portion 18 is moved to the right (FIG. 4) at least to a position flush with the right side of the base portion 2 at the shoulder 4. This carries the lowermost record to the right to such an extent that the center hole thereof passes over the edge of the shoulder 4 and the record loses its support and is guided downward by the base portion 2.

The means responsible for the last two steps of movement of lever 14 are these: From the abutment portion 24, the lever 14 tapers to a blunt point or follower portion 26, thereby providing a cam surface 27 at the right side of said lever. The rod 12 has at its upper end a cam 28 defined by a plane which slants downward to another cam 29 defined by a planar surface inclined considerably more than the inclination of the cam 28. On upward movement of the cam carrier 12, the lever 14 is moved upward thereby because of cooperation between the cam 28 with the follower portion 26 until the lower end of slot 21 engages the pin 22, at the uppermost position of the lever. Until it reaches its uppermost position, the force of spring 23 is adequate to maintain engagement between the tip 26 and the cam 28. Because the upward movement of rod 12 is continuous, however, after the lever reaches its extreme upper position, the resistance of spring 23 is overcome by cam 28, the inclination of which is adequate to shift the point 26 therefrom so that for the remainder of the upward stroke of rod 12 cam 29 slides against the surface 27 to rock the lever to its ejecting position. At that position, the rocking movement of lever 14 may be resisted by engagement of a stop lug 31 thereon with the back portion 17.

As the lowermost record is displaced adequately, as explained, for its release from the shoulder 5, the remaining records drop downward to be supported by the ejector head 18. They are concurrently held against edgewise displacement by the gate member 3. Following these operations, the rod 12 is moved downward in accordance with the remainder of its cyclical operation. During the latter step the cams 27 and 29 remain engaged until the remaining records have been lowered to the support of shoulder 4. Once the load of the records has been so transferred, the spring 23 swings the lever 14 backward again, and slight downward movement thereof may be made to its FIG. 2 position.

In the process of ejecting a record from the shoulder 4 variations in the operating speed of lever 14 are noteworthy. For example, from its normal position the ejector portion 18 is moved quickly to the upper position (FIG. 3) substantially at the speed of the rod 12. Then by cooperation of the cams 27 and 29 the ejector portion is carried laterally at a reduced speed. Then, in keeping with the remainder of the cyclic motion of rod 12, the remaining records are lowered at the speed of said rod to the support of shoulder 4. This last operation of lowering the records may be at a rate which is rapid enough to afford economy in time in the course of a record changing cycle yet slow enough to deposit the records on the shoulder without a shock which would be detrimental to the records, or production of noise of impact with the shoulder 4. During the short period in which the remaining records are carried by the lever 14, it is completely shrouded by the base portion 2, with the exception of the ejector portion 18 extending above the shoulder 4 (FIG. 4), since the force of spring 23 is inadequate to move the lever out from under even a single record. Immediately following ejection of a final record from the shoulder 4, however, in the course of a cycle, the spring rocks the lever to its FIG. 3 position after which it is free to be moved downward by gravity as rod 12 finishes its cycle of motion.

Although the invention has been described in one embodiment thereof, I am aware that numerous and extensive departures may be made therefrom without departing from the spirit or scope of my invention.

I claim:

1. A record changer assembly for use with disk records having central openings therethrough, comprising: a post having a record supporting shoulder and a longitudinally extending passageway therein below said shoulder, an ejector lever located within said passageway, pivot means including a pivot pin fixed to said post and extending across said passageway for pivotally supporting said ejector lever for pivotal movement about said pin and for limited longitudinal movement within said passageway, said ejector lever having a first cam surface extending below said pivot pin, an operator element located in said passageway and adapted for longitudinal movement therein and having a second cam surface engaging said first cam surface, one of said cam surfaces effecting pivotal movement of said ejector lever upon relative longitudinal movement of said operator with respect to said lever, spring means independent of and out of contact with said operator affixed to said ejector lever at a point above said pivot pin and operably engaging said lever and the inner wall of said passage for applying a biasing pivotal force to said ejector lever about said pin in the direction opposite to the pivotal force on said lever due to the action of said cam surfaces, said lever being moved to the limit of its upper movement by said operator element and the force of said spring means being sufficient to prevent pivotal movement of said lever about said pin until said lever has reached the limit of its upper longitudinal movement.

2. A record changer assembly for use with disk records having central openings therethrough, comprising: a post having a record supporting shoulder and a longitudinally extending passageway therein below said shoulder, an ejector lever located within said passageway, pivot means including a pivot pin fixed to said post and extending across said passageway for pivotally supporting said ejector lever for pivotal movement about said pin and for limited longitudinal movement within said passageway, said ejector lever having a follower portion extending below said pivot pin for all positions of said longitudinal movement, an operator element located in said passageway and adapted for longitudinal movement therein and having a surface engaging a surface of said follower portion below said pivot pin, one of said engaging surfaces comprising a camming surface for effecting pivotal movement of said ejector lever upon relative longitudinal movement of said operator with respect to said lever, said ejector lever intermediate its ends having an elongated slot engaged by said pivot pin, a spring disposed wholly beyond the extremities of said slot and being independent and out of contact with said operator, said spring being affixed to said ejector lever and operably engaged between said lever and the internal wall of said passage above said pivot for applying pivotal force for said ejector lever about said pin in the direction opposite to the pivotal force on said lever due to the camming action resulting from the relative movement of said element and said lever toward each other, said lever being moved to the limit of its upper movement by said operator element and the force of said spring being sufficient to prevent pivotal movement of said lever about said pin until said lever has reached the limit of its upper longitudinal movement.

3. A record changer assembly for use with disk records having central openings therethrough, comprising: a post having a record supporting shoulder and a longitudinally extending passageway therein below said shoulder, an ejector lever located within said passageway, pivot means including a pivot pin fixed to said post and extending across said passageway for pivotally supporting said ejector lever for pivotal movement about said pin and for limited longitudinal movement within said passageway, said ejector lever having a follower portion extending below said pivot pin for all positions of said longitudinal movement, an operator element located in said passageway and adapted for longitudinal movement therein and having a surface engaging a surface of said follower portion below said pivot pin, one of said engaging surfaces comprising a camming surface for effecting pivotal movement of said ejector lever upon relative longitudinal movement of said operator with respect to said lever, said ejector lever intermediate its ends having an elongated slot engaged by said pivot pin, a cantilever spring disposed wholly beyond the extremities of said slot and being independent and out of contact with said operator, said spring having terminals operably engaged between said lever and the internal wall of said passage for applying pivotal force to said ejector lever about said pin in the direction opposite to the pivotal force on said lever due to the camming action resulting from the relative movement of said element and said lever toward each other, one of said terminals being fixed to said lever and the other of said terminals slidably engaging said passageway above said pivot, said lever being moved to the limit of its upper movement by said operator element and the force of said spring means being sufficient to prevent pivotal movement of said lever about said pin until said lever has reached the limit of its upper longitudinal movement.

References Cited by the Examiner

UNITED STATES PATENTS

| | | | |
|---|---|---|---|
| 2,628,843 | 2/53 | Comstock | 274—10 |
| 2,629,604 | 2/53 | Pifer | 274—10 |
| 2,634,983 | 4/53 | Dale | 274—10 |
| 3,000,637 | 9/61 | Quest | 274—105 |

LOUIS J. CAPOZI, *Primary Examiner.*

STEPHEN W. CAPELLI, ALDRICH F. MEDBERY, *Examiners.*